Figures 1, 2:
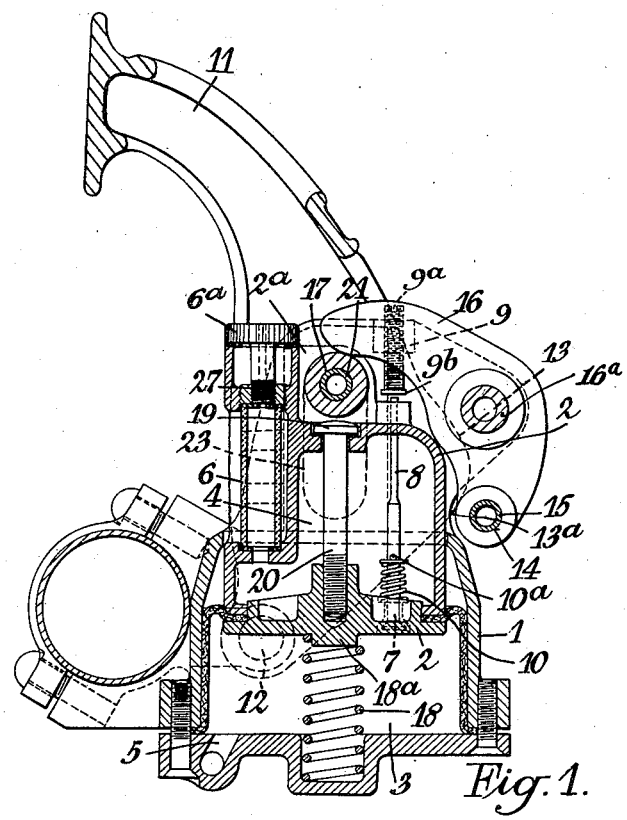

Oct. 15, 1935.   W. L. AVERY   2,017,035
OPERATING MEANS FOR BRAKES AND THE LIKE
Filed Sept. 17, 1934   2 Sheets-Sheet 1

W. L. Avery
INVENTOR
By Glascock Downing & Seebold
Attys.

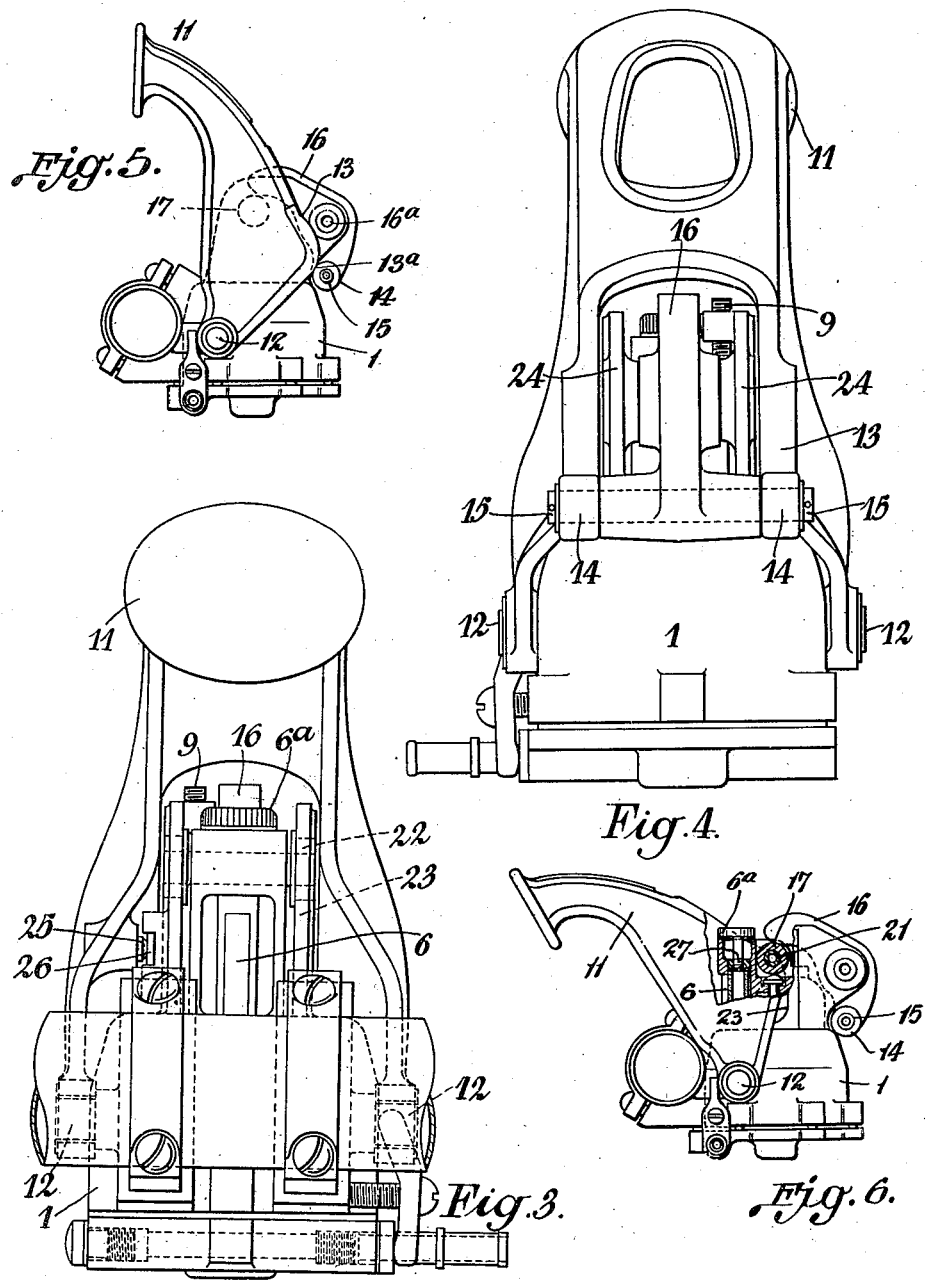

Patented Oct. 15, 1935

2,017,035

UNITED STATES PATENT OFFICE 2,017,035

OPERATING MEANS FOR BRAKES AND THE LIKE

William Leicester Avery, Thorley, Bishop's Stortford, England

Application September 17, 1934, Serial No. 744,456
In Great Britain September 19, 1933

8 Claims. (Cl. 60—54.6)

This invention relates to operating means for brakes, clutches and other devices operated by fluid pressure and of the kind which comprises a pair of relatively movable members, for instance a cylinder and piston, defining a fluid chamber from which fluid can be expelled consequent upon relative movement taking place between the two members.

The invention has for its object to provide improvements in connection with apparatus of the above kind particularly as regards the replacing of any loss of fluid from the fluid chamber.

According to the invention means of the above kind is provided wherein the movable member is formed with or carries a reservoir for make-up fluid for the fluid chamber.

The invention also consists in means of the above kind wherein the movable member carries a valve which is opened upon the movable member reaching a position within the cylinder where the volume of the fluid chamber is a maximum so as to permit of the flow of make-up fluid from a reservoir associated with the movable member to the said fluid chamber.

The invention also consists in means according to the preceding paragraph wherein the valve is operated by means external to the fluid chamber.

Further features of the invention will be hereinafter described or indicated.

In the accompanying drawings:—

Figure 1 is a vertical section on the line 2—2 of Figure 2 illustrating one form of the invention, Figure 2 is a plan view, Figures 3 and 4 are end views looking towards the right and left respectively of Figure 1, Figure 5 is a side elevation of Figure 1, and Figure 6 is a part sectional side elevation of Figure 1 but showing the foot pedal moved into the position where filling of the reservoir is permitted.

In carrying the invention into effect in one convenient manner and as illustrated in the drawings, the operating means comprise a cylinder 1 and a piston 2 movable therein to expel fluid from the cylinder in order to operate the brake or other device, which piston is of hollow formation so as to provide, on that side of the face of the piston which is remote from the cylinder space 3, a chamber 4 which forms a reservoir for make-up fluid for the cylinder, the latter being provided with an outlet 5 for the fluid expelled therefrom and the hollow piston being preferably fitted with a gauge glass 6 whereby the make-up fluid within the reservoir may be observed. At the top of the gauge glass there may be fitted a plug 6ª which is removable to enable filling of the reservoir.

Passage of the fluid from the reservoir to the cylinder takes place under the control of a valve 7 carried by the piston and normally maintained closed, the valve being opened upon the piston reaching its maximum outward position so as to permit fluid to flow from the reservoir into the cylinder and so replace any fluid that may be lost from the latter. This valve may have a conical face seated upon a conical seating formed in the face of the piston (the wide side of the seating being disposed towards the cylinder space) and the valve stem 8 may be arranged to extend through the hollow piston and project beyond the outer end thereof so as to engage with a stop or abutment member 9 disposed outside the cylinder and preferably made capable of adjustment to enable variations to be made in the time of opening the valve which may take place automatically consequent upon the projecting end of the valve stem contacting with the stop or abutment member. In the particular example illustrated the abutment 9 consists of a screw stud which is accessible, at 9ª, for adjustment and has its other end formed with a flange 9ᵇ for engagement by the end of the valve spindle 8 which projects through the upper wall of the piston.

By suitable adjustment of the screw stud 9 it is possible to adjust the effective stroke of the piston and consequently of the effective capacity of the cylinder.

A spring 10 for maintaining the valve in its closed position during operation of the device may be in the form of a helical spring surrounding the valve stem and extending between the rear face of the valve seating in the piston and a stop 10ª provided on the valve stem.

The piston may be arranged to be actuated by a pedal 11 pivotally mounted at 12 and provided with cam-shaped portions 13, 13ª arranged in engagement with a pair of abutment rollers 14 disposed one at each end of a transverse spindle 15 to which there is secured intermediate the abutment rollers one arm of a bell-crank lever 16 pivoted at 16ª and the other arm of which bell-crank engages an abutment roller 17 arranged in contact with the outer end 19 of a stud 20 screwed into the top of the piston 2. The roller 17 is carried between the side walls 2ª of the top of the hollow piston chamber 4 and is carried by a transverse spindle 21 to each end of which, on the outside of each said side wall 2ª, there is secured another abutment roller 22 each of which is guided for vertical movement within slots 23 formed in the upper side walls 24 of the cylinder casing. Upon depression of the pedal therefore the cam surfaces thereon will move over the abutment rollers 14 engaging therewith and cause movement of the bell-crank lever 16 which produces inward movement of the piston 2 so as to expel fluid from the cylinder through this lever pressing against the abutment roller 17 bearing upon the stud 20 connected with the piston. The cam-shaped portions on the pedal are each provided with a cam surface 13ª initially in engagement with the rollers 14 and which is substantially parallel with, or only slightly inclined to, a tangent on each of the said rollers at the point of contact therewith of its said cam surface, and a further cam surface 13 adapted to enter into engagement with the rollers 14 after the pedal has been moved to a predetermined extent and which second-mentioned cam surface is, in the initial or inoperative position, relatively steeply inclined to the said tangent in a direction away from the centre of each roller 14.

The return of the piston upon release of the pedal may be effected by spring action, for example, by the action of a helical spring 18 disposed between the face of the piston and the inside of the opposite wall of the cylinder which spring is energized during the inward movement of the piston to expel fluid from the cylinder space. The piston face may be formed at its centre with a recess or projection 18ª to receive one end of this spring.

Conveniently, the piston may be formed in two parts assembled together by a screw, or screws, for example, and the gauge glass for the fluid reservoir formed by these piston parts when assembled together may be detachably secured to one such detachable piston part so as to be capable of removal when the piston is assembled.

The foot lever 11 is held in position for operation as shown in Figure 4 by the engagement of spring urged ball catch 25, carried upon the pedal, behind a lug 26 on one of the walls 24 of the cylinder casing but when it is desired to fill the reservoir 4 this ball locking device can be overcome manually by forcing the ball 25 over the lug 26 so that the pedal occupies the position shown in Figure 4 where the plug 6ª is accessible for removal so as to expose the piston reservoir filling orifice 27.

It is to be understood that the foregoing detailed description is furnished solely with a view to assisting in the understanding of the nature of the invention and that numerous modifications thereof may be effected without exceeding the scope of the invention.

I claim:

1. A pump for supplying pressure fluid to brakes, for example, comprising a cylinder containing the pressure fluid, a hollow piston movable within the cylinder to expel the fluid therefrom, the interior of the piston forming a reservoir for make-up fluid for the cylinder, and a valve carried by the piston and adapted to be opened to establish communication between the reservoir and cylinder when the piston reaches a position within the cylinder where the volume of the cylinder is a maximum.

2. A pump for supplying pressure fluid to brakes, for example, comprising a cylinder containing the pressure fluid, a piston movable within the cylinder to expel the fluid therefrom and carrying with it a reservoir containing make-up fluid for the cylinder and a valve carried by the reservoir and adapted to establish communication between the reservoir and the cylinder upon the piston reaching a predetermined position within the cylinder.

3. A pump for supplying pressure fluid to brakes, for example, comprising a cylinder containing the pressure fluid, a piston movable within the cylinder to expel the fluid therefrom, a reservoir carried by and movable with the piston, the said reservoir containing make-up fluid for replenishing the fluid in the cylinder, a valve carried by the reservoir and adapted, during movement of the piston and reservoir, to close the latter against communication with the cylinder and a fixed stop or abutment which is engaged by the valve upon the piston returning to its extreme position within the cylinder where the volume of the latter is a maximum.

4. A pump for supplying pressure fluid to brakes, for example, comprising a cylinder containing the pressure fluid, a piston movable within the cylinder to expel the fluid therefrom, a reservoir carried by and movable with the piston, the said reservoir containing make-up fluid for replenishing the fluid in the cylinder, a valve carried by the reservoir and adapted, during movement of the piston and reservoir, to close the latter against communication with the cylinder and a fixed stop or abutment which is engaged by the valve upon the piston returning to its extreme position within the cylinder where the volume of the latter is a maximum, the said means being adjustable to vary the time of opening of the valve and hence the capacity of the cylinder.

5. A pump for supplying pressure fluid to brakes, for example, comprising a cylinder containing the pressure fluid, a piston movable in said cylinder to expel the fluid therefrom, a reservoir movable with the piston and containing make-up fluid for the cylinder, the said reservoir having a filling opening for the fluid, a valve carried by the reservoir and adapted to control the flow of the make-up fluid therefrom into the cylinder, a pedal or like element for actuating the piston and means which normally restrict movement of the pedal but which is adapted for release at will to allow movement of the pedal for access to be made to the fluid replenishing opening in the reservoir which orifice is obstructed by the pedal in its operational positions.

6. A pump for supplying pressure fluid to brakes, for example comprising a cylinder containing the pressure fluid, a piston movable in said cylinder to expel the fluid therefrom, a reservoir movable with the piston and containing make-up fluid for the cylinder, the said reservoir having a filling opening for the fluid, a valve carried by said reservoir and adapted during movement of the piston and reservoir to close the latter against communication with the cylinder, a stop or abutment adapted to be engaged by the valve when the piston reaches the end of its return movement within the cylinder so as to open the valve and establish communication between the reservoir and cylinder, a pedal or like element for actuating the piston and means which normally restrict movement of the pedal but which is adapted for release at will to allow movement of the pedal for access to be made to the fluid replenishing opening in the reservoir, which orifice is obstructed by the pedal in its operational positions.

7. A pump for supplying pressure fluid to brakes, for example, comprising a cylinder containing the pressure fluid, a piston movable in said cylinder to expel the fluid therefrom, a reservoir movable with the piston and containing make-up fluid for the cylinder, the said reservoir having a filling opening for the fluid, a valve carried by said reservoir and adapted during movement of the piston and reservoir to close the latter against communication with the cylinder, an adjustable stop or abutment adapted to be engaged by the valve when the piston reaches the end of its return movement within the cylinder so as to open the valve and establish communication between the reservoir and cylinder, adjustment of said stop or abutment altering the time of opening the valve, a pedal or like element for actuating the piston and means which normally restrict movement of the pedal but which is adapted for release at will to allow movement of the pedal for access to be made to the fluid replenishing opening in the reservoir, which orifice is obstructed by the pedal in its operational positions.

8. A pump for supplying pressure fluid to brakes, for example, comprising a cylinder containing the pressure fluid, a piston movable within the cylinder to expel the fluid therefrom, a reservoir movable with the piston and containing make-up fluid for the cylinder, a valve carried by the reservoir and adapted during movement of the piston and reservoir to close the latter against communication with the cylinder, a stop or abutment carried by a fixed part of the operating means and adapted to be engaged by the valve upon the piston reaching the end of its return movement within the cylinder so as to establish communication between the reservoir and the cylinder and a gauge glass carried by the reservoir to indicate the level of the fluid therein.

WILLIAM LEICESTER AVERY.